(12) United States Patent
Lopatka et al.

(10) Patent No.: US 12,518,750 B2
(45) Date of Patent: Jan. 6, 2026

(54) METHOD AND SYSTEM OF MULTIPLE TASK AUDIO ANALYSIS WITH SHARED AUDIO PROCESSING OPERATIONS

(71) Applicant: Intel Corporation, Santa Clara, CA (US)

(72) Inventors: Kuba Lopatka, Gdansk (PL); Tomasz Dorau, Gdansk (PL); Maciej Muchlinski, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 898 days.

(21) Appl. No.: 17/462,857

(22) Filed: Aug. 31, 2021

(65) Prior Publication Data

US 2021/0398535 A1 Dec. 23, 2021

(51) Int. Cl.

| | |
|---|---|
| *G10L 15/00* | (2013.01) |
| *G10L 15/02* | (2006.01) |
| *G10L 15/22* | (2006.01) |
| *G10L 15/16* | (2006.01) |
| *G10L 25/30* | (2013.01) |

(52) U.S. Cl.
CPC .............. *G10L 15/22* (2013.01); *G10L 15/02* (2013.01); *G10L 15/16* (2013.01); *G10L 25/30* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 21/0208; G10L 25/78; G10L 25/87; G10L 15/14; G10L 15/197; G10L 15/1815; G10L 15/16; G10L 25/27; G10L 25/30; G10L 19/00; G10L 19/005; G10L 17/26
See application file for complete search history.

(56) References Cited

U.S. PATENT DOCUMENTS

| | | | |
|---|---|---|---|
| 9,792,907 B2 | 10/2017 | Bocklet et al. | |
| 10,504,507 B2* | 12/2019 | Busch | .............. G10L 15/16 |
| 10,714,122 B2* | 7/2020 | Muchlinski | .............. G10L 25/84 |
| 10,789,941 B2 | 9/2020 | Lopatka et al. | |
| 11,355,100 B2* | 6/2022 | Wu | .............. G10L 15/1815 |
| 11,631,407 B2* | 4/2023 | Gordon | .............. G10L 15/08 |
| | | | 704/275 |
| 2017/0148444 A1 | 5/2017 | Bocklet et al. | |
| 2019/0043489 A1 | 2/2019 | Lopatka et al. | |
| 2019/0043491 A1 | 2/2019 | Kupryjanow et al. | |
| 2020/0184987 A1 | 6/2020 | Kupryjanow et al. | |

OTHER PUBLICATIONS

Abeber, J., "A Review of Deep Learning Based Methods for Acoustic Scene Classification", Applied Sciences, 2020, 10(6): 2020. https://doi.org/10.3390/app10062020.

Barchiesi, et al., "Acoustic Scene Classification", ArXiv, abs/1411. 3715; 2014.

Choi, H., et al. , "Phase-Aware Speech Enhancement with Deep Complex U-Net" , Published as a conference paper at ICLR 2019.

(Continued)

*Primary Examiner* — Vu B Hang
(74) *Attorney, Agent, or Firm* — Akona IP PC

(57) ABSTRACT

A method, system, and article of multiple task audio analysis uses shared audio processing operations.

25 Claims, 9 Drawing Sheets

(56) References Cited

OTHER PUBLICATIONS

Higuchi, T., et al., "Robust MVDR Beamforming Using Time-Frequency Masks for Online/Offline ASR in Noise", ICASSP, 2016.
Lopatka, K., et al., "State Sequence Pooling Training of Acoustic Models for Keyword Spotting", Interspeech (2020).
Lopez-Meyer, P., et al., "Efficient End-toEnd Audio Embeddings Generation for Audio Classification on Target Applications", IEEE International Conference on Acoustics, Speech and Signal Processing (ICASSP), pp. 601-605, doi: 10.1109/ICASSP39728.2021.9414229 (2021).
Sigtia, S., et al., "Multi-Task Learning for Speaker Verification and Voice Trigger Detection", arXiv:2001.10816v1; ICASSP 2020; 2020 IEEE International Conference on Acoustics, Speech and Signal Processing (ICASSP), Barcelona, Spain, 2020, pp. 6844-6848, doi: 10.1109/ICASSP40776.2020.9054760.
Suh, S., et al., "Designing Acoustic Scene Classification Models with CNN Variants Technical Report", Detection and Classification of Acoustic Scenes and Events 2020.
Sun, M., et al., "Max-pooling loss training of long short-term memory networks for small-footprint keyword spotting", IEEE Spoken Language Technology Workshop (SLT), pp. 474-480, Dec. 2016.
Tonami, N., et al., "Joint Analysis of Acoustic Events and Scenes Based on Multitask Learning", arXiv:1904.12146v4 [cs.SD]; 2019.

\* cited by examiner

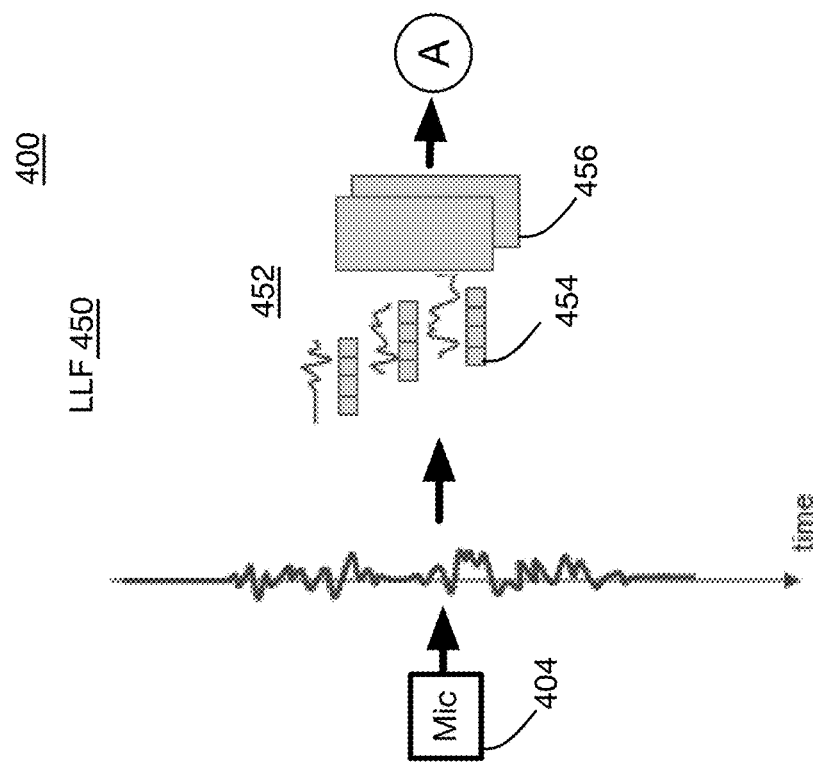
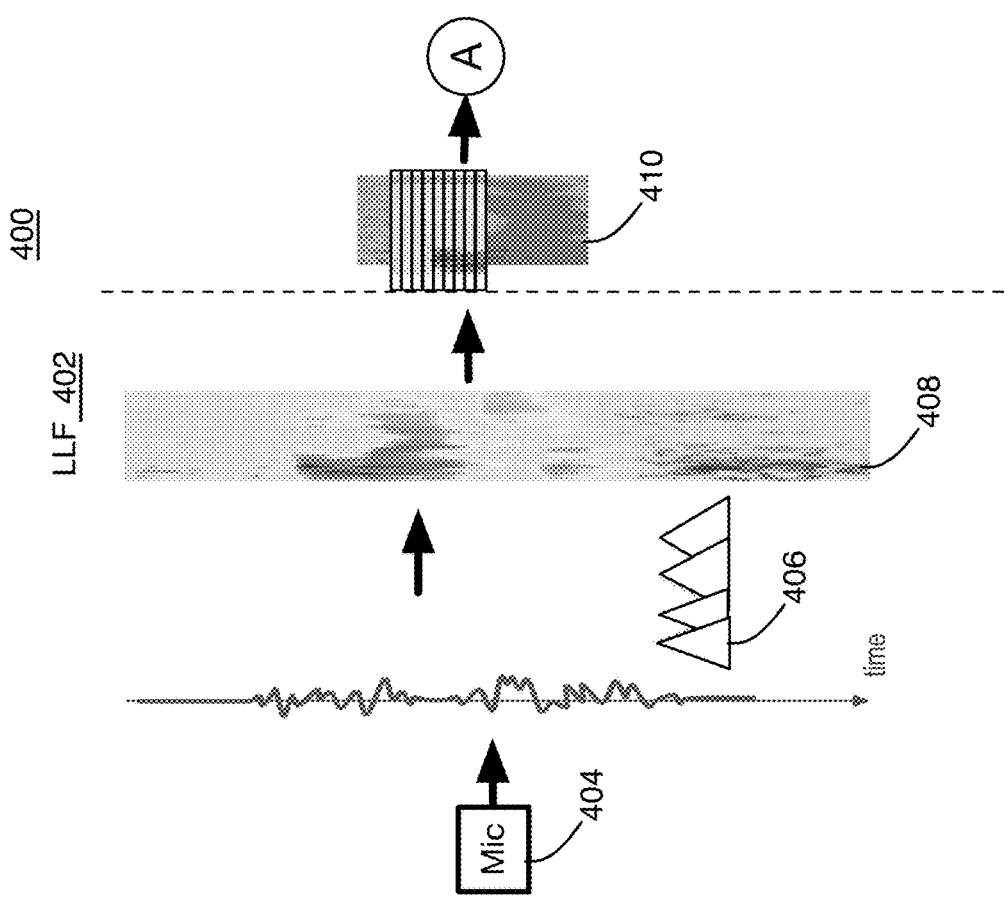

METHOD AND SYSTEM OF MULTIPLE TASK AUDIO ANALYSIS WITH SHARED AUDIO PROCESSING OPERATIONS

BACKGROUND

Computers and small mobile computing devices such as smart phones often provide audio analysis (or audio algorithms) that perform a number of different tasks including automatic speech recognition (ASR) tasks such as keyphrase or keyword spotting (KWS) as well as non-speech tasks such as audio event detection (AED), and acoustic scene classification (ASC) to name a few examples. The KWS (also referred to as keyword detection (KWD) or hot word detection) such as Wake-on-Voice (WoV) systems detect a word or phrase often to initiate an activity by a device. For example, the device may wake by transitioning from a low power listening state or sleep mode to an active mode, and in many cases, activates a particular computer program such as a personal assistant (PA) application. The AED application detects many different sounds, which may or may not include human speech, such as a baby crying, alarms, glass breaking, a door knock or doorbell, gunshot, and so forth that also can trigger another activity by the computing device such as alerting a user of the device. ASC is an audio analysis application that classifies the environment of the device capturing the acoustics in the environment. Such classifications may or may not include semantic classifications, and may include differentiating among environments such as the open outdoors, an office in a building, a vehicle interior, a large indoor space such as a theater or cafeteria, and so forth where the classification of the environment can assist with fine tuning the settings for ASR, speaker recognition (SR), and other audio task.

Such systems are often placed on multi-purpose devices such as smart phones where the consumers increasingly demand energy savings to increase power life of the device while also demanding the highest possible quality. This is especially difficult when the audio applications mentioned are often always-on or always listening applications while each audio application has its own fixed function hardware and independent operations which add to the computational load and memory consumption, and in turn battery usage, on the device. When the different audio tasks of the various audio applications have at least some redundant audio processing operations, such an arrangement is unnecessarily wasteful.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 4A-4C is a schematic diagram of a detailed audio processing system to perform multiple task audio analysis with shared audio processing operations according to at least one of the implementations herein;

DETAILED DESCRIPTION

Figure 1:
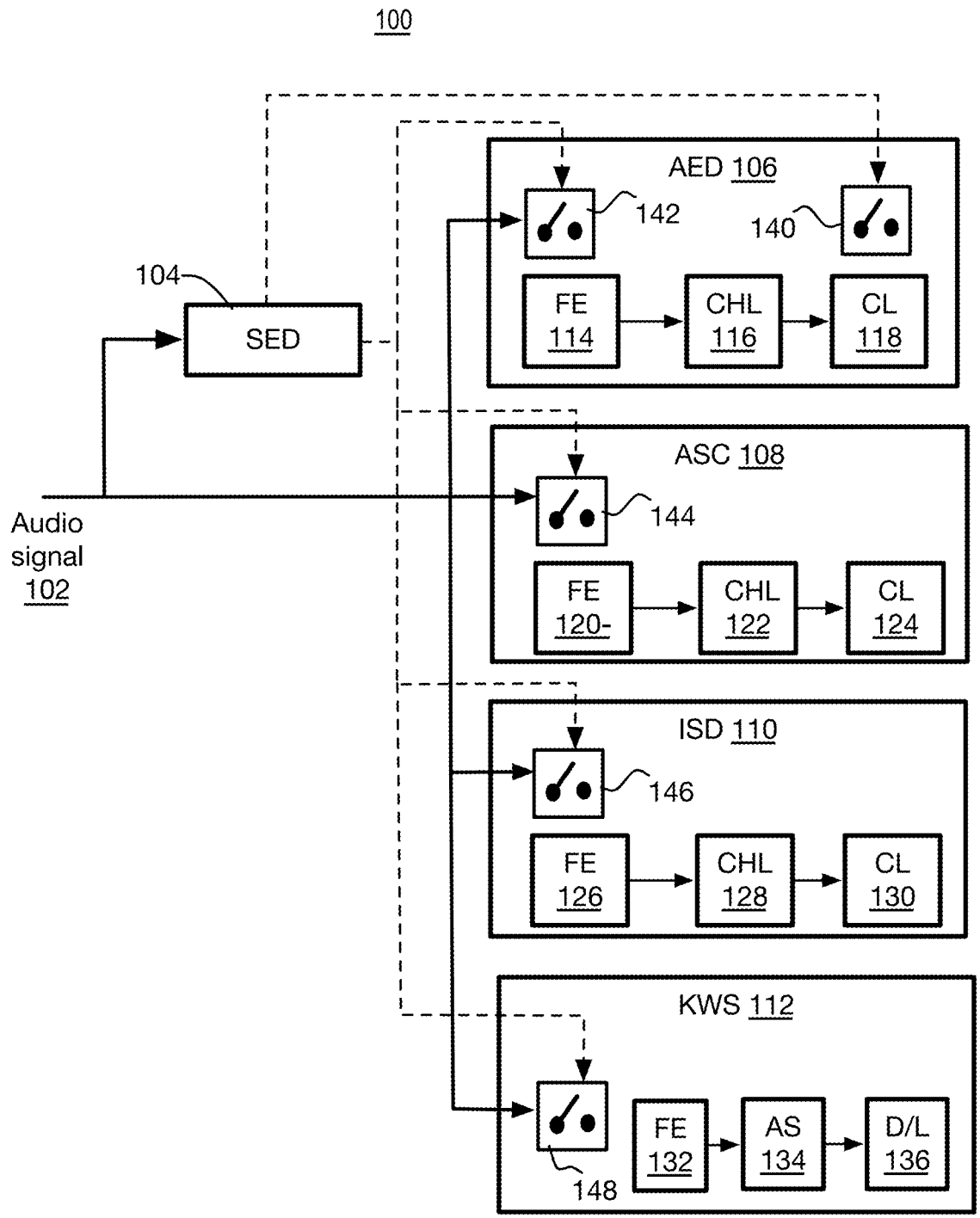
FIG. 1 is a schematic diagram of a conventional audio processing system.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, laptops, tablets, internet of things (IoT), servers, computers, and any other multi-audio task device or system, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM);

magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples herein except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, apparatuses, computing platforms, and articles are described herein related to multiple task audio analysis with shared audio processing operations.

The always listening audio algorithms such as keyword spotting (KWS or keyword detection (KWD)), as well as acoustic event detection (AED), acoustic scene classification (ASC), and so forth typically are operated by a digital signal processor (DSP) subsystem of a system on a chip (SoC) or a companion chip. To avoid battery drainage, the power consumption added by the processors performing all of the different audio algorithms should be kept to a minimum, which puts rigorous constraints on compute and memory budgets for the algorithms.

Referring to FIG. 1 for example, a conventional audio processing system 100 on a computing device may receive an audio signal 102 via one or more microphones for example. A sound energy detection (SED) unit 104 detects sound energy in certain sought-after sound patterns and provides an activation signal to activation switches 142, 144, 146, and 148 respectively to activate the audio algorithms at separate and independent audio application units here in this example including an AED unit 106, an ASC unit 108, an instant speech detection (ISD) unit 110 which is similar to AED except much faster and usually limited to speech (or human) detection rather than many different sounds as in AED, and a KWS unit 112. Additionally, the SED unit 104 provides sound level information to an activation switch 140 of the AED unit 106 to factor the sound level in the AED decision making. This is useful for discriminating between impulsive acoustic events (e.g. door closing) and background noise.

Each of the audio application units (or acoustic detection units) 106, 108, 110, and 112 performing a different task have a low-level feature extraction (FE) unit 114, 120, 126, or 132, as well as convolutional high-level feature extraction (CHL) units 116, 122, and 128. The low level feature extraction obtains detected signal frequency levels such as Mel-frequency-related signal values, and then scales, compresses, combines, and/or parameterizes the values to provide log-energy values or Mel-frequency cepstrum coefficients (MFCCs) for example. The high-level features that are output of the high-level feature extraction convolutional layers represent long duration spectral patterns. The AED unit 106, ASC unit 108, and ISD unit 110 each have a classification unit (CL) 118, 124, and 130 respectively to perform a different audio task whether detecting an audio event or audio environment. The KWS unit 112 has an acoustic scoring model or units (AS) 134 and a decoding/language interpretation model or unit (D/L) 136. The different types of acoustic detection as shown by the units 106, 108, 110, and 112 are used in parallel, each as a standalone pipeline usually with separate firmware for each unit. They are defined as different types due to different tasks performed, different type of output, and/or different performance speeds. This arrangement results in redundant operations where low-level feature extraction is performed by the FE units 114, 120, 126, and 132 respectively at each unit 106, 108, 110, and 112 analyzing the same audio signal and having very similar output. Also, the high-level feature extraction is redundant at least for the non-speech event and environment detection units as well. This leads to unnecessary redundancy in compute and memory overhead, and in turn wasteful power consumption.

To attempt to reduce the computational load, memory usage, and power consumption, the audio applications are frequently run on hardware accelerators. Examples of available accelerators include Intel's® gaussian neural accelerator (GNA), Synaptic's Katana Edge AI™ platform, Arm Cortex-M55 processor, Apple Neural Engine (ANE), other neural network application-specific integrated circuits (ASICs), and so forth. Hardware acceleration helps to reduce power but the resources of the accelerator are also limited. So for example, if the algorithms are integrated independently (possibly even originating from different vendors), then the resources needed by all of the algorithms accumulate, and eventually the computational load becomes large enough to cause a bottleneck that delays processing.

To resolve these issues, a method of fusing or integrating at least parts of multiple different audio processing algorithms is disclosed. The method eliminates redundant operations typically performed separately for the different audio processing algorithms that are acoustic context awareness (ACA) algorithms, and this efficient operation of integrating audio processing algorithms may be used even though one or more of the audio processing algorithms perform speech recognition while one or more other audio processing algorithms performs audio classification or non-speech audio analysis such as event detection and/or environment classification. Particularly, a number of the audio processing algorithms that have an always-on or always-listening mode may share the same activation processing, such as sound energy detection (SED), and share at least the feature extraction operations. By one form, many of the audio signal detection and classification algorithms can share the same low-level feature extraction that represents different audio frequency levels in an audio signal. In addition, the audio classification algorithms, as well as speech recognition algorithms in certain forms, can share high-level feature extraction that provides outputs that detect or indicate spectral patterns and by one form relatively long duration spectral patterns. The same output from the feature extraction can then be used by separate parallel pipelines of each of the audio processing algorithms. This is accomplished even though keyword spotting (KWS) typically uses voice activation range sound energy detection, while audio classification (AED or ASC) uses a wider range. Similarly, KWS uses 13 or 40, or other number, human perception-based Mel-frequency (40 log-filterbank) feature extraction, while audio classification algorithms often uses about 64 or more level log-filterbank to parameterize non-speech sounds. It has been found that KWS efficiency does not lower even when SED is expanded to awaken audio applications with a wider range of sound energy activators beyond human speech, and the non-speech algorithms are still quite accurate even when using a lower number of Mel-frequency or other human-perception-based levels typically used for speech detection.

The result is that the multiple audio processing algorithms can run with less accelerator hardware resources than the sum of the individual resources needed by each algorithm when run completely separately. This reduces computational load and memory usage, and in turn power consumption, which makes audio detection and classification processing more efficient, especially for small devices, and without a reduction in quality and accuracy. It was found that the present method performing always-listening algorithms operated by a DSP environment on a SoC, for example, reduces memory usage by about 32% and the compute by about 50% compared to operating the audio processing algorithms as completely separate operations.

Figure 2:
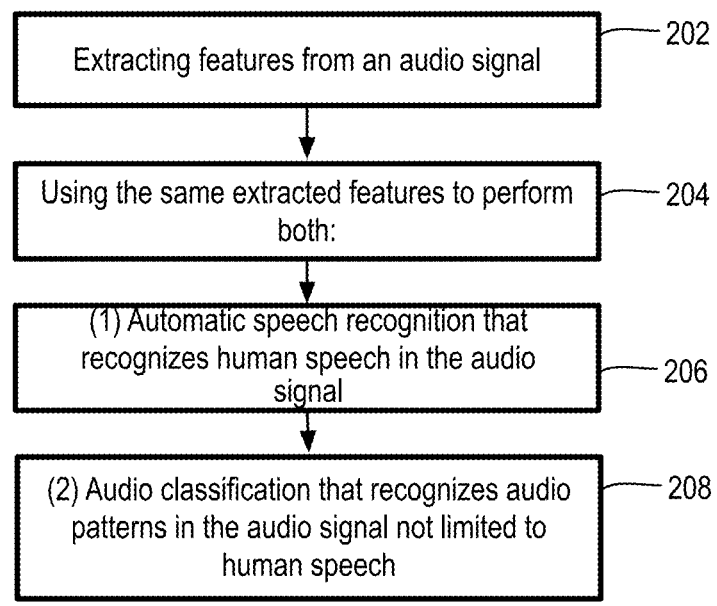
FIG. 2 is a method of multiple task audio analysis with shared audio processing operations according to at least one of the implementations herein.

Referring to FIG. 2, an example process 200 of audio processing may include a computer-implemented method of multiple task audio analysis with shared audio processing operations. In the illustrated implementation, process 200 may include one or more operations, functions or actions as illustrated by one or more of operations 202 to 208 numbered evenly. By way of non-limiting example, process 200 may be described herein with reference to example audio processing systems or devices described herein with any of FIGS. 3 to 5, and where relevant.

Process 200 may include "extracting features from an audio signal" 202, and this may be performed in a number of different ways as long as two or more of the algorithms of different audio tasks, whether KWS, AED, ASC, ISD, speaker identification (SR), and so forth, can share the output of the feature extraction. Preliminarily, this operation includes sound energy detection (SED) to first activate the audio operations described herein.

By one approach, the feature extraction may have low-level feature extraction that compresses or parameterizes the audio signal in the form of Mel-frequency-related values, such as Mel-frequency log-energy values, or may be other human-perception-based frequency levels. The output of the low-level feature extraction may be provided for high-level feature extraction, which may include convolutional layers that generate values that indicate spectral patterns from the audio signal. The low-level feature extraction also may operate convolutional layers that parameterize the audio signal frequency levels instead of using Mel-frequency level computations.

Process 200 may include "using the same extracted features to perform both" 204, "(1) automatic speech recognition that recognizes human speech in the audio signal" 206, and "(2) audio classification that recognizes audio patterns in the audio signal not limited to human speech" 208. Here, this operation clarifies that both speech and non-speech detection (or classification) audio tasks can be combined to share the feature extraction. By one form, both speech and non-speech audio task operations share the low-level feature extraction while just the non-speech audio task operations share the high-level feature extraction due to the different needs of sample size. Particularly, non-speech audio classification or detection tasks such as AED, ISD, and ASC usually uses long sample sizes of audio patterns, and with lengths such as about 0.5 to 2.0 seconds, and by one form 1.0 second, while KWS for example, usually uses much shorter sample sizes such as 50 to 200 ms, and by one form 100 ms.

By some alternatives, KWS techniques are used that can use longer sample sizes and share the high-level feature extraction output with the non-speech audio task operations as well. Other details are provided below.

Figure 3:
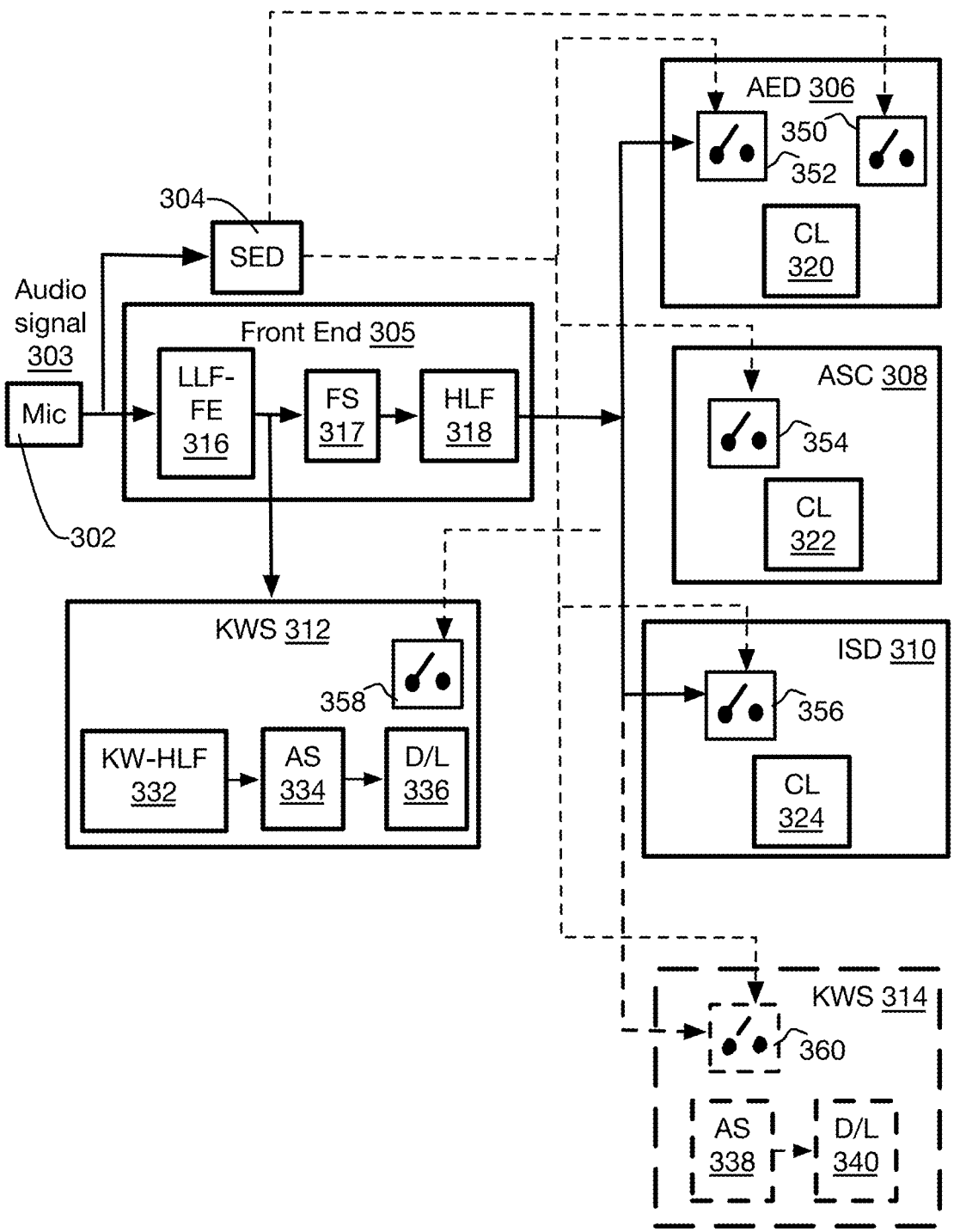
FIG. 3 is a schematic diagram of an audio processing system to perform multiple task audio analysis with shared audio processing operations according to at least one of the implementations herein.

Referring to FIG. 3, an audio processing system 300 can be used to perform multiple task audio analysis with shared audio ACA processing operations. The system 300 may have a microphone 302 that receives sound waves as audio input. Microphone 302 may convert the audio waves or audio input to an electrical signal such as a digital or analog audio signal 303. The audio signal 303 is provided to an SED unit 304 to activate the various audio task units AED unit 306, ASC unit 308, ISD unit 310, and KWS unit 312. The audio signal 303 also is provided to a front end unit 305 that performs shared or common feature extraction to generate feature outputs that are used by the various audio task units. Specifically, while here, it has been found efficient to fuse ACA algorithms such as: (1) Sound Energy Detector (SED), (2) Keyword spotting (KWS) OR KWD, (3) acoustic event detection (AED), (4) acoustic scene classification (ASC), and (5) Instant speech detection (ISD), these are merely a few examples and other types of ACA algorithms that can share the same extracted features could be added or used instead. One example of such an algorithm is speaker identification.

In detail, SED unit 304 may receive the audio signal 303 and may operate (e.g., via a DSP or other processor) even in a deep sleep mode of system 300 to continuously monitor audio signal or data 303. The sound energy detector (SED) unit 304 reacts to change in acoustic activity and computed input signal levels. This is achieved by using methods such as root mean square (RMS) level calculations, adaptive thresholds, and so forth. Upon detection of sound energy of a voice or other sound that requires further evaluation by system 300, the SED unit 304 may provide an initiation signal, which may activate the other units of system 300 to perform the various tasks. Additionally, SED unit 304 may provide sound level information to one or more ACA algorithms to include the signal level into the decision making. This is useful for discriminating between impulsive acoustic events (e.g., door closing) and background noise, especially because sound level information may be lost during feature extraction in subsequent blocks.

For example, upon a sufficient sound energy that could be a voice or other targeted sound, the SED unit 304 may send an initiation or wake-up signal to an audio level activation switch 350 as well as an activation switch 352 of the AED unit 306, an activation switch 354 of the ASC unit 308, an activation switch 356 of the ISD unit 310, and an activation switch 358 of the KWS unit 312. As explained below, an alternative KWS unit 314 also may have an activation switch 360. Once these switches are activated, the various units may perform any required setup while a front end 305 that performs feature extraction may start obtaining input audio signal data as buffered By the SED if that is provided, and thereafter directly as the audio is being input to system 300.

The front end 305, which may or may not include the SED unit 304, may have a low-level feature extraction (LLF-FE) unit 316, a frame stacking unit (FS) 317, and a high-level feature extraction (HLF) unit 318. which transforms audio into features that can be used by the various ACA applications. By one form, the LLF-FE 316 may formed of a Mel-filterbank that generates log Mel-frequency energy values and/or Mel-frequency cepstrum coefficients (MFCCs) for example. The LLF-FE may be run on a DSP, and may utilize single instruction, multiple data (SIMD) instructions to reduce processing power. Alternatively, an LLF-FE convolutional neural network may be used to provide the features, or log frequency energy levels. More details are provided with system 400 and FIGS. 4A-4B below.

For this example system 300, the KWS unit 312 shares the output of the low-level feature extraction unit 316 with the non-speech classification units 306, 308, and 310. Since the KWS unit 312 typically uses much shorter samples than that used by the non-speech units, the KWS unit 312 does not share the output of the high-level feature extraction unit 318. Specifically, the samples are often aligned with a log-Mel frontend so that the low-level feature extraction often uses 25 ms samples at 10 ms intervals. LLFs can operate with a different frame length and shift than HLFs, which should operate with sample sizes and timing expected by the various applications. In the case for the KWS, the KWS unit 312 may perform its own frame stacking to stack four LLF samples to form a 100 ms sample or other relatively short samples often used by KWS. Meanwhile, the frame stacking unit 317 may stack 40 of the LLF output samples to form a 1 second sample or other relatively longer size sample for HLF to provide features to the other classification ACA applications. The stacking may involve concatenating the feature frames together or other such combining operation, and this operation simply may involve obtaining the features from memory in a certain desired order to form vectors or tensors to use them as input into neural networks for the high-level feature extraction.

As to the HLF, the HLF unit 318 may apply a neural network including convolution layers that receive either the Mel-frequency log energy filterbank values or LLF neural network feature energy outputs from the LLF as inputs, and then the HLF network outputs values that each represent relatively long duration spectral pattern characteristics, such as signal harmonic component distributions and their time relations (for example, modulation characteristics for an alarm signal). Stated another way, the high level features may operate on spectrograms as input (spectral levels vs time), and the HLF represent or output frequency-domain patterns rather than time-domain patterns such as with signal slopes for example. The details of an example structure of the HLF network is provided on FIG. 4C.

The HLF output is then used by acoustic models of the various ACA applications. By one approach, the AED unit 306 has a classification unit 320 that may use classification neural network layers or other AI or machine learning algorithm that decides whether or not an even is indicated by the high-level features. This may be achieved by using a classification neural network with recurrent and/or affine layers to provide scene or acoustic scores, often referred to as posterior probabilities.

The ASC unit 308 may be similar to the AED unit 306 by also using a classification neural network 322 that recognizes scenes or environments where the audio is captured and provides scene acoustic scores or posterior probabilities. The ISD unit 310 performs a similar task as the AED unit 306 except with a classification unit 324 that uses a much smaller neural network and may be arranged to more narrowly detect human speech rather than other various sounds.

The KWS unit 312 has a KW-HLF unit 332 to perform its own high-level feature extraction with relatively small samples. It also may have an acoustic scoring unit 334 that forms an acoustic model and provides KWS posterior probabilities or phoneme or triphone scores as well as a decoding and/or language model unit that determines which words were spoken in the audio signal, or whether or not a keyword was spoken.

Figure 3A:
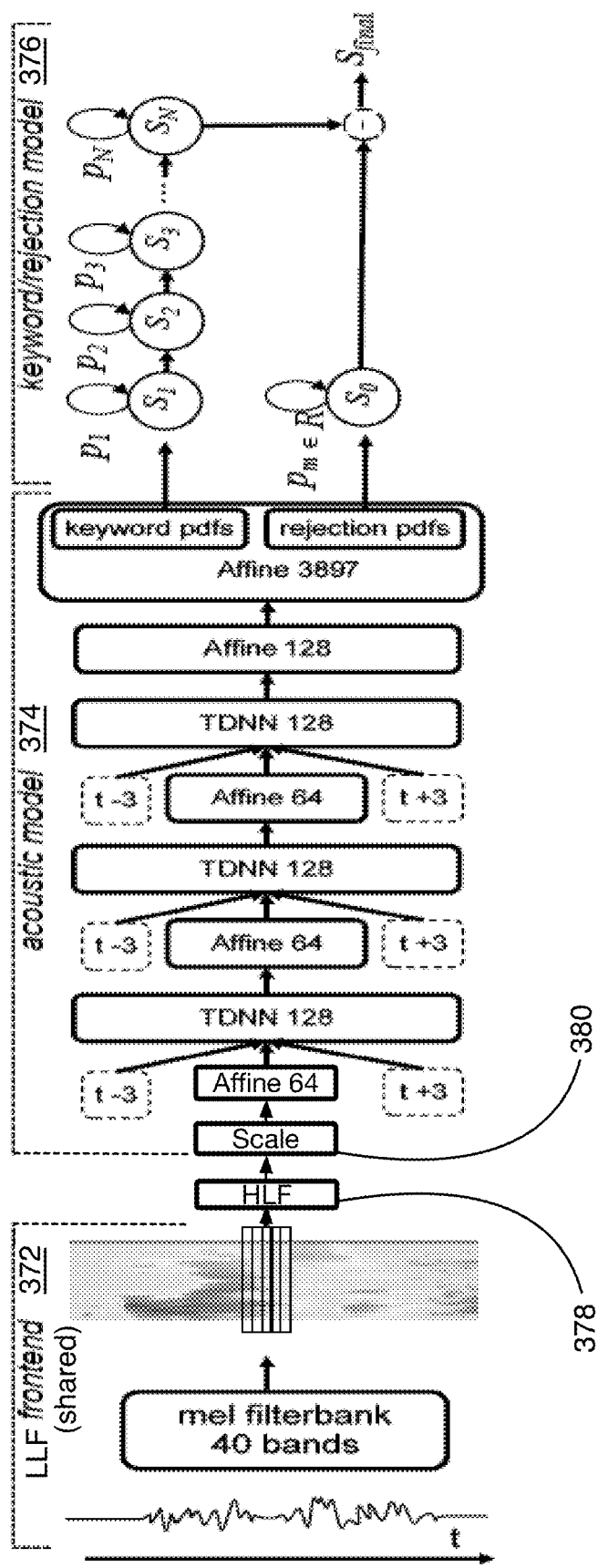
FIG. 3A is a schematic diagram of an example keyword spotting system according to at least one of the implementations herein.

Referring to FIG. 3A, the KWS unit 312 may be an example KWS (or KWD) unit or system 370 and has a shared front end 372 that receives an audio signal over time and is sampled. The system 370 then applies a human-perception-based filter or Mel filterbank to the audio signal samples, often with 40 bands. The resulting Mel-frequency levels are then analyzed and computed into Mel-frequency log energy levels or MFCCs. Then, a high-level feature extraction unit 378 may be used to form features that represent different audio signal pattern characteristics, and these features may be arranged to provide a time series of feature vectors.

An acoustic model 374 then uses the feature vectors to generate keyword posterior probabilities. Such feature vectors may be scored based on an acoustic model such as a deep neural network (DNN) or the like to provide the scores of the sub-phonetic units. For example, at least some of the sub-phonetic scores may be associated with a likelihood a particular triphone has been spoken, but can also score sub-phonetic units that are single phoneme (or single phones or monophones), sub-phones, or even provide a single output score for multiple tri-phones. A scale unit 380 may scale the feature vectors, and the scaled output is then fed to a series of affine and time-delay neural network layers.

By one approach, the input to a time-delayed neural network (TDNN) forming the acoustic model may be the 40 log-Mel features stacked in a superframe of 5 frames (5×40=200 inputs). The overall receptive field of the TDNN, factoring in time-delay connections, may be 17 frames (i.e., 170 ms). The TDNNs for KWS recognizes acoustic units such as phoneme or triphone states whose duration is in the range of 50 to 200 ms, and in one form 100 ms, as mentioned. In contrast, the model of the HLF unit 318 may have a much larger receptive field of 100 frames (1 second) or more. In turn, the HLF is able to extract long-term (global) patterns or characteristics of acoustic events or scenes, such as spectral patterns, and whose duration may be in the range of 0.5 to 2 seconds, and in one example 1.0 second. An example time-delayed neural network (TDNN) topology for keyword spotting is disclosed by Lopatka, K., et al., "State Sequence Pooling Training of Acoustic Models for Keyword Spotting", *INTERSPEECH* (2020).

The KWS system 370 also may have a decoder that is a keyword and rejection model 376. By one approach, this model generates likelihood scores as a difference between the likelihood scores of the key phrase (or keyword) model and the rejection model. Such a keyphrase detection system is disclosed by U.S. Pat. No. 9,792,907 to T. Bocklet et al., filed Nov. 24, 2015, and issued Oct. 17, 2017, and U.S. Patent Publication No. 2017/0148444, to T. Bocklet, et al., published on May 25, 2017, which are both incorporated herein for all purposes. The final score (or probability Sfnai) may be provided to a decision unit that makes a final determination as to whether the keyword is present.

Referring again to FIG. 3, and by another alternative, a KWS unit 314 could be arranged to use the longer samples of the HLF unit 318 instead of KWS unit 312. In this case, the HLF model is leveraged for keyword spotting when the topology of the keyword spotting network is adapted to do so. An example of such topology is a recurrent topology with max pooling as presented in Sun, M., et al., "Max-pooling loss training of long short-term memory networks for small-footprint keyword spotting", *IEEE Spoken Language Technology Workshop (SLT)* (pp. 474-480) (2016, December). In this case, the KWS unit 314 has an acoustic score model or unit 338 and decoder and/or language model (D/L) unit 340 to determine whether keywords are present in the input audio.

It will be appreciated that the methods herein are not limited to the specific audio tasks mentioned herein, and different algorithms with different audio (ACA) tasks could be operated with the same frontend (e.g., speaker identification).

Figure 4C:
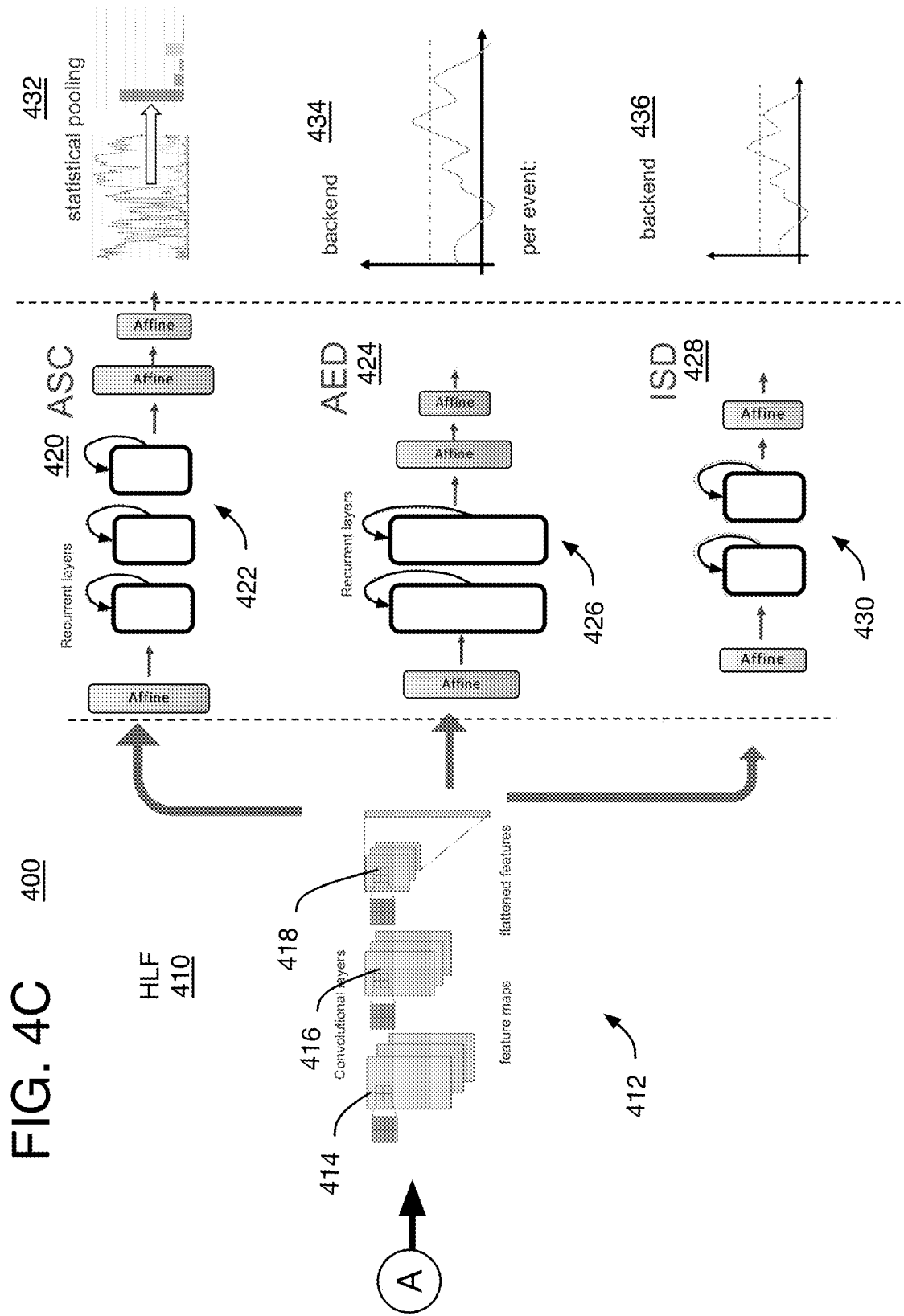

Referring to FIGS. 4A-4C, and to further illustrate how the non-speech acoustic context awareness (ACA) algorithms can be fused, an in-depth view of one example model topology of audio processing system 400 is provided to perform the audio tasks of the ACA applications described parameterize the data. Thus, an example HLF unit 410 receives the LLF values and inputs the values into one example HLF convolutional neural network 412. The network 412 has convolutional layers 414 and 416 that generate feature maps, and then later layers 418 that flatten the features thereby representing audio patterns, or specifically spectral patterns for example. The example HLF model topology 412 can have convolutional layers with max pooling (maxpool) and rectified linear unit (ReLU) activation as shown on table below where 2DCNN refers to a 2D convolutional neural network layer. The resulting output is feature vectors to be provided for acoustic scoring.

| Layer (in order from first to last) | Input size (X × Y) | | filters/ units | Input channels | kernel | | stride | | padding | | output size | |
|---|---|---|---|---|---|---|---|---|---|---|---|---|
| 2DCNN | 100 | 40 | 8 | 1 | 3 | 3 | 2 | 1 | 0 | 0 | 49 | 38 |
| 2DCNN | 49 | 38 | 16 | 8 | 3 | 3 | 1 | 1 | 0 | 0 | 47 | 36 |
| maxpool | 47 | 36 | 16 | 16 | 3 | 3 | 2 | 2 | 0 | 0 | 23 | 18 |
| 2DCNN | 23 | 17 | 32 | 32 | 3 | 3 | 1 | 1 | 0 | 0 | 21 | 15 |
| maxpool | 21 | 15 | 32 | 32 | 3 | 3 | 2 | 2 | 0 | 0 | 10 | 8 |
| 2DCNN | 10 | 7 | 32 | 32 | 3 | 3 | 1 | 1 | 0 | 0 | 8 | 5 |
| maxpool | 8 | 5 | 32 | 32 | 3 | 3 | 2 | 2 | 0 | 0 | 2 | 2 | herein. The topologies are merely examples as the input size, as well as layer types and sizes, can be altered.

Preliminarily, the system 400 may alternatively have LLF unit structures 402 and 450 to perform the low-level feature extraction. Thus, for the Mel-frequency LLF 402, one or more microphones 404 may capture audio waves in the air, convert them to a digital audio signal for example, and divide the signal into samples as mentioned above. When triggered by an SED unit described above, the LLF unit 402 may perform FFT to generate a power spectrum, and 40 triangular filters of a Mel-frequency filterbank 406 may be applied to the spectrum to generate Mel-frequency levels or spectrogram 408. Log is then applied and the levels are arranged by a log unit 410 that can be arranged into feature vectors to be input to the HLF unit. These are example log-energy values here, but could be converted into MFCC or other coefficient values if desired.

Referring to FIG. 4B, alternative low-level feature extraction unit 450 receives the audio signal as described above for LLF unit 402, except here, audio signal values are input to a convolutional neural network 452 to perform the feature extraction. The values are arranged into vectors 454 that overlap in time, and then are input to convolutional layers 456. In this case, low level neural network features are used in lieu of a filterbank frontend. By one form, the convolutional layers include 1D-convolutional layers. The output is scaled audio signal values that each represent a feature according to a set of learnable filters. The filters do not necessarily correspond to any frequency band, and may not be hand-crafted filters. However, the filter levels still convey equivalent information as log-Mel features as far as discriminative power is concerned. See Lopez-Meyer, p., et al., "Efficient End-to-End Audio Embeddings Generation for Audio Classification on Target Applications," *IEEE International Conference on Acoustics, Speech and Signal Processing (ICASSP)*, pp. 601-605, doi: 10.1109/ICASSP39728.2021.9414229 (2021), which is incorporated herein for all purposes.

Referring to FIG. 4C, whether the LLF outputs scaled values or log Mel-frequency energies, these values do not yet reveal audio signal patterns. They simply compress or As to the classification operations by the separate parallel pipelines of the non-speech ACA applications, an ASC unit 420 has an acoustic model neural network 422 with affine and recurrent layers, and which classifies the feature frames into phonetic units (phonemes, acoustic events, acoustic scenes etc.). This may be executed in a neural network accelerator, here Intel GNA. The acoustic model may be divided into two parts as per the state of the art in acoustic scene analysis. The resulting backend classifications 432 may be presented in the form of statistical pooling. See Abeßer J. A., "Review of Deep Learning Based Methods for Acoustic Scene Classification", Applied Sciences, 10(6): 2020, https://doi.org/10.3390/app10062020; Suh, S., et al., "Designing Acoustic Scene Classification Models with CNN Variants Technical Report", Media Coding Research Section, Electronics and Telecommunications Research Institute (2020); and U.S. Patent Publication No. 2020/0184987 to Kupryjanow, filed Feb. 10, 2020 and published Jun. 11, 2020, all of which are incorporated herein for all purposes.

For the AED unit 424, it also has a classifying neural network 426 with affine and recurrent layers. The backend 434 shows a threshold or pattern matching graph to detect events. See U.S. Pat. No. 10,789,951 to Lopatka, et al., filed on Sep. 28, 2018, and issued Sep. 29, 2020, which is incorporated herein for all purposes.

An instant speech detection (ISD) unit 428 has an ISD network 430 also with recurrent and affine layers. A backend 436 shows or represents event classifications 436. (ISD) has detects the presence of speech relatively instantaneously, i.e., with a latency of about 100 ms. ISD is similar to AED but it is optimized for a different working point and here it is treated as a separate algorithm pipeline.

As shown on the experimental results below, one benefit of the disclosed multiple audio task processing with shared operations methodology is that it reduces the resource consumption without significantly changing the accuracy of the results produced by the algorithms. In Table 1 below, the resources consumed by the conventional systems are presented for comparisons to the disclosed method with results shown in table 2. A table 3 shows the results of the comparisons.

In table 1, the tests measured processing speed in million cycles per second (MCPS) and memory usage in kilobytes (kB) on an intel Gaussian neural network accelerator (GNA) and Hifi4 DSP operating multiple audio tasks in a conventional manner. DSP resources were estimated by simulation in an Xtensa environment whereas GNA resources were estimated by using GNA hardware architecture. The same was applied for the disclosed operation sharing method as shown in Table 2.

TABLE 1

Resources consumption of the conventional system

| Module | GNA MCPS | GNA memory [kB] | DSP MCPS | DSP memory [kB] |
|---|---|---|---|---|
| SED | 0.00 | 0 | 0.50 | 10 |
| AED | 2.99 | 400 | 4.50 | 50 |
| ASC | 2.65 | 300 | 3.50 | 35 |
| ISD | 2.58 | 280 | 3.50 | 35 |
| KWS | 0.78 | 280 | 3.00 | 50 |
| Total | 8.99 | 1260 | 15.00 | 180 |

TABLE 2

Resources consumption of the invented system

| Module | GNA MCPS | GNA memory [kB] | DSP MCPS | DSP memory [kB] |
|---|---|---|---|---|
| SED | 0.00 | 0 | 0.50 | 10 |
| FE/LLF | 0.00 | 0 | 2.00 | 20 |
| HFL | 2.45 | 200 | 0.50 | 0 |
| AED | 0.54 | 200 | 2.00 | 30 |
| ASC | 0.20 | 100 | 1.00 | 15 |
| ISD | 0.13 | 80 | 1.00 | 15 |
| KWS | 0.78 | 280 | 1.00 | 30 |
| Total | 4.10 | 860 | 8.00 | 120 |

As summarized in table 3 below, the present method shows a reduction in resources consumed in each category. Of particular note, it was found that the present method performing always-listening algorithms operated by a DSP environment on a SoC, for example, reduces memory usage on combined average up to about 32% and the compute on combined average up to about 50% compared to operating the audio processing algorithms as completely separate operations.

TABLE 3

Resources consumption summary of both systems

| Resource type | Conventional System | Disclosed System | Saved resources | Saved resources [%] |
|---|---|---|---|---|
| GNA MCPS | 8.99 | 4.10 | 4.89 | 54% |
| GNA memory [kB] | 1260 | 860 | 400 | 32% |
| DSP MCPS | 15.00 | 8.00 | 7.00 | 47% |
| DSP memory [kB] | 180 | 120 | 60 | 33% |
| Combined MCPS | 23.99 | 12.10 | 12 | 50% |
| Combined memory | 1440 | 980 | 460 | 32% |

While implementation of the example process 200 and systems 300 and 400 discussed herein may include the undertaking of all operations shown in the order illustrated, the present disclosure is not limited in this regard and, in various examples, implementation of the example processes herein may include only a subset of the operations shown, operations performed in a different order than illustrated, or additional or less operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, operations, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 5:
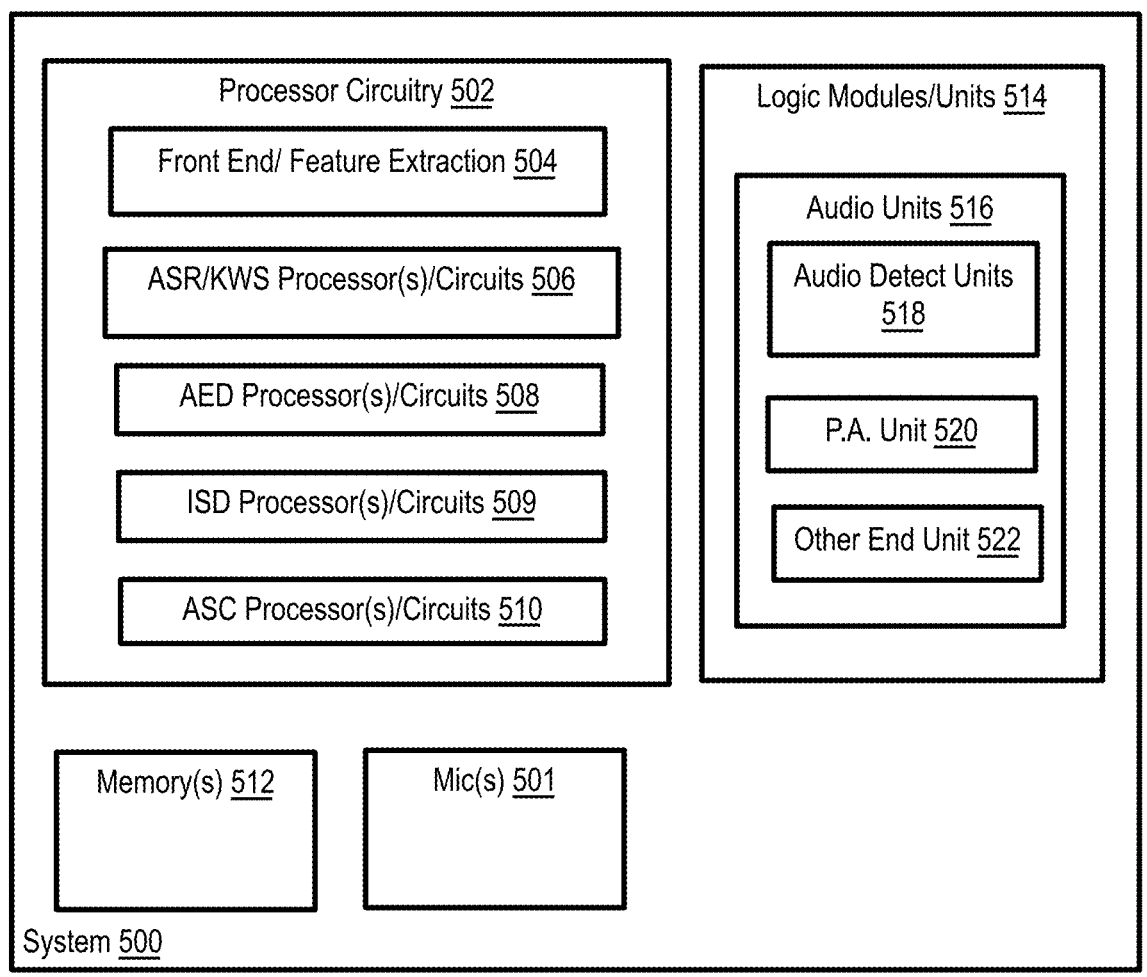
FIG. 5 is an illustrative diagram of an example system for performing a method according to at least one of the implementations herein.

Referring to FIG. 5, an example system 500 for performing multiple task audio analysis using shared audio processing operations according to the implementations described above is arranged in accordance with at least some implementations of the present disclosure. As shown on FIG. 5, system 500 may have one or more microphones 501, processor circuitry 502 that forms one or more processors, memory 512, and logic modules or units 514. The processor circuitry 502 may form one or more processors, whether one or more central processors to run software as well as one or more digital signal processors (DSPs) or other fixed function circuitry that operates or at least partially forms a front end/feature extraction unit 504, ASR/KWS processor circuits 506, AED processor circuits 508, ISD processor circuits 509, and ASC processor circuits 510. It will be appreciated that any other ACA or audio analysis application also may be formed or operated by circuits, such as one or more DSPs where the DSPs may or may not be specific function or purpose DSPs dedicated for specific tasks.

Each of the circuits 504, 506, 508, 509, and 510 may form the circuits to run at least part if not all of the units related to each audio task. Thus, for example, the front end unit 504 may have units to operate SED (if not provided separately by other processors of the processor circuitry 502), LLF, and HLF operations, while the KWS circuit may operate KW-LLF, an acoustic model, and a decoder for example. The other non-speech circuits 508-510 may have an acoustic model unit and the classification units as described above with systems 300 (FIG. 3) and 400 (FIG. 4).

The logic modules 514 may include audio units 516 that have audio detection units 518 that is any of the software, such as controls and so forth, that run or form part of the audio analysis units described above with systems 300 or 400 including the SED, LLF, HLF, AED, ASC, ISD, and KWS units for example. The logic modules 514 also may have end-applications that use the determinations from these units, such as a personal assistant units 520 (such as Siri, Alexa, and so forth for example) and other end units 522 that operate any other applications that can use the determinations mentioned herein, whether security or authorization systems, audio monitoring systems, safety systems, internet of things (IoT) systems and so forth.

Processor(s) 502 may include any number and type of processing units that may provide the operations as discussed herein. As mentioned, such operations may be implemented via software or hardware or a combination thereof. For example, processor 502 may include circuitry dedicated to manipulating data obtained from memory 512 or dedicated memory. When processor(s) 502 are formed of a digital signal processor (DSP), and/or other fixed function hardware such as fixed function neural network processing hardware, these may be in the form of hardware acceleration, and may include Intel© GNA (Gaussian Neural Accelerator) and SIMD instructions of a Tensilica DSP. Otherwise, the disclosed processor(s) herein can be a DSP subsystem of Intel® SoCs, or one or more companion chips by other examples. Thus, processor(s) 502 may be specific purpose hardware for the specific audio tasks only, or may be shared to perform other non-audio analysis tasks as well. Furthermore, one or more general or central processing unit (CPU) formed by processor(s) 502 and used herein may include any number and type of processing units or modules that may provide control and other high level functions for system 500 as well as the operations of logic modules as discussed herein. By one form, CPUs could be used to operate any of the operations disclosed herein including any whole or part of the audio analysis applications described herein. In the illustrated example, system 500 may be configured to perform audio analysis while sharing the audio processing operations mentioned herein. In an implementation, system 500 may be considered to include or exclude any one or combination of the modules or units shown here on system 500. It will be understood that the operation of the units or modules shown here perform tasks similar to those unit or modules with similar or related labels elsewhere herein.

Also as shown, memory 512 may store the audio signal as well as any of the other data being used whether inputs, data in intermediate stages, or final output data for any of the units mentioned herein, and including any relevant neural network structure data or training data used to train the neural networks mentioned herein. Memory 512 also may store input speech data, SED parameters or data, coefficient data, feature vectors, scores, output scores, keyphrase, event, or scene scores or probabilities, log likelihood scores, thresholds, or any other data or data structures as discussed herein. Memory 512 may be any type of memory such as volatile memory (e.g., Static Random Access Memory (SRAM), Dynamic Random Access Memory (DRAM), etc.)

or non-volatile memory (e.g., flash memory, etc.), and so forth. In a non-limiting example, system memory 512 may be implemented by cache memory.

While implementation of the example process 200 and systems 300 and 400 discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

Figure 6:
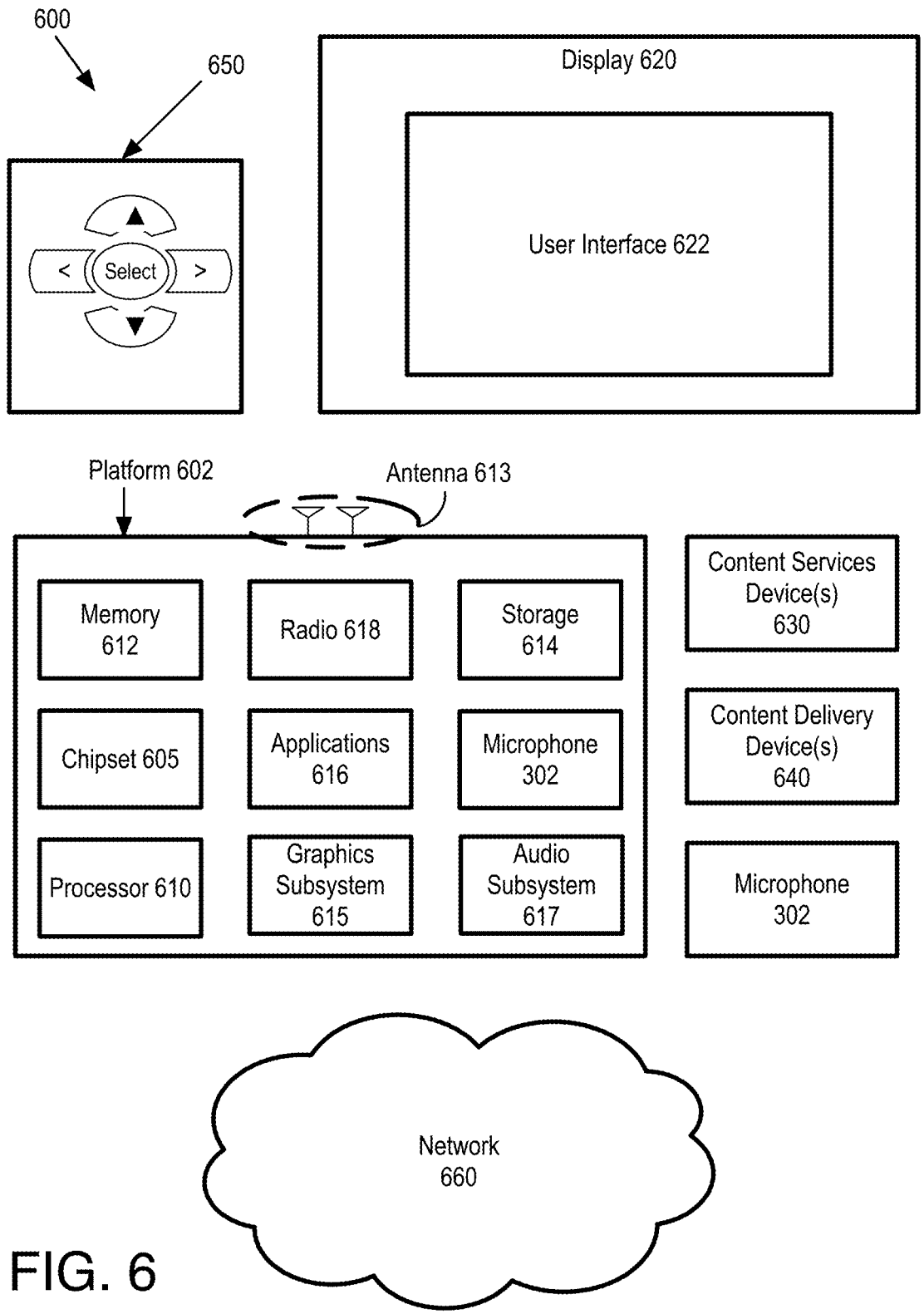
FIG. 6 is an illustrative diagram of an example system.

FIG. 6 is an illustrative diagram of an example system 600, arranged in accordance with at least some implementations of the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 600 includes a platform 602 coupled to a display 620. Platform 602 may receive content from a content device such as content services device(s) 630 or content delivery device(s) 640 or other similar content sources. As shown, in some examples, system 600 may include microphone 302 implemented via platform 602 or remotely coupled to the platform. Platform 602 may receive input speech via microphone 302 as discussed herein. A navigation controller 650 including one or more navigation features may be used to interact with, for example, platform 602 and/or display 620. Each of these components is described in greater detail below.

In various implementations, system 600 may provide an audio subsystem or subsystem circuit 617 that provides audio algorithms and applications, including hardware, software, and/or firmware as described herein. For example, SED, LLF, HLF, ASR, KWS, AED, ASC, ISD, and other audio-related applications may provide wake on voice and classification capability for a device or environment as described herein. In other implementations, this includes the hardware, firmware, and/or software to train any neural networks for these applications. Such training may be performed offline prior to run-time detection or classification for example.

Otherwise, in various implementations, platform 602 may include any combination of a chipset 605, processor 610, memory 612, antenna 613, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 615. In some implementations, graphics subsystem 615 may be a stand-alone device communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of uni-directionally or bi-directionally communicating content between content providers and platform 602 and/display 620, via network 660 or directly. It will be appreciated that the content may be communicated uni-directionally and/or bi-directionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In various implementations, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In various implementations, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 5.1 surround sound audio and/or high definition 7.1 surround sound audio, for example. Drivers may include a graphics driver for integrated graphics platforms. In various implementations, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various implementations, platform 602 and display 620 may be an integrated unit. Display 620 and content service device(s) 630 may be integrated, or display 620 and content delivery device(s) 640 may be integrated, for example. These examples are not meant to limit the present disclosure.

In various implementations, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 6.

Figure 7:
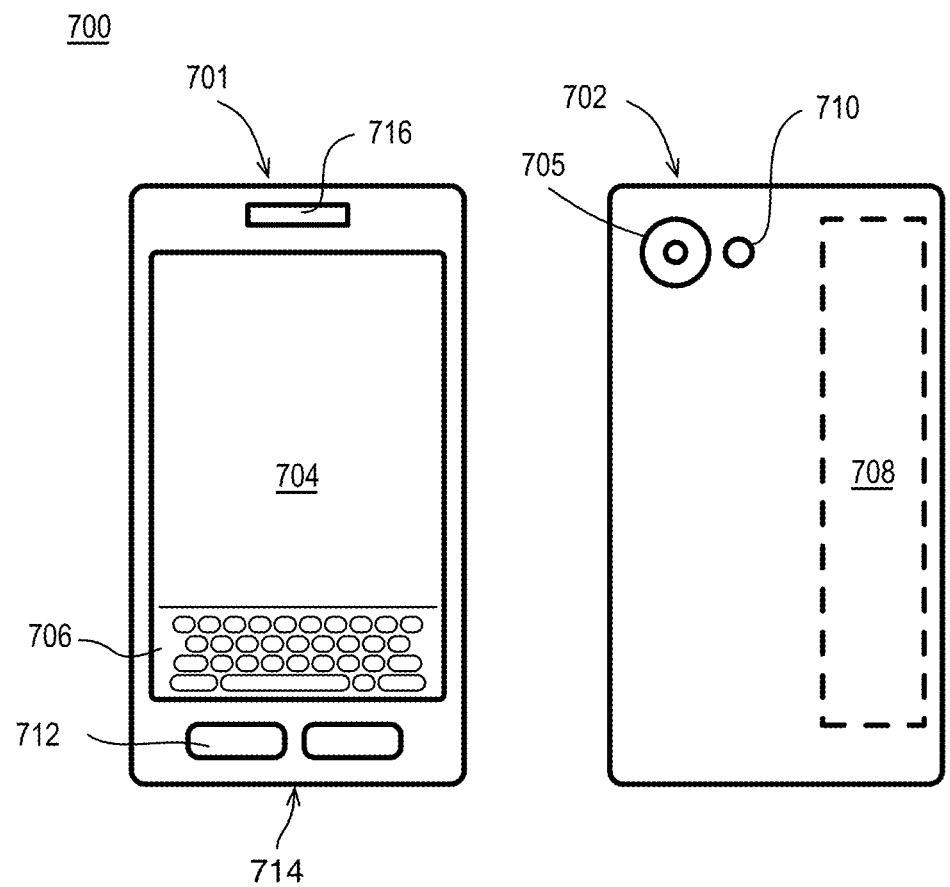
FIG. 7 illustrates an example device, all arranged in accordance with at least some implementations of the present disclosure.

As described above, system 500 or 600 may be embodied in varying physical styles or form factors. Referring to FIG. 7, a small form factor device may be arranged in accordance with at least some implementations of the present disclosure. In some examples, system 500 or 600 may be implemented via device 700. In other examples, other devices or systems, or portions thereof may be implemented via device 700. In various implementations, for example, device 700 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 7, device 700 may include a housing with a front 701 and a back 702. Device 700 includes a display 704, an input/output (I/O) device 706, and an integrated antenna 708. Device 700 also may include navigation features 712 and one or more microphones 714 and speakers 716. I/O device 706 may include any suitable I/O device for entering information into a mobile computing device. Examples for I/O device 706 may include an alphanumeric keyboard, a numeric keypad, a touch pad, input keys, buttons, switches, audio analysis or voice recognition device and software as described herein, and so forth. Information may be entered into device 700 by way of microphone 714, or may be digitized by the methods and systems described herein. As shown, device 700 also may include a camera 705 (e.g., including a lens, an aperture, and an imaging sensor) and a flash 710 integrated into back 702 (or elsewhere) of device 700.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), fixed function hardware, field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer-implemented method of audio processing comprises extracting features from an audio signal; and using the same extracted features to perform both: (1) automatic speech recognition that recognizes human speech in the audio signal, and (2) audio classification that recognizes audio patterns in the audio signal not limited to human speech.

By one or more second implementation, and further to the first implementation, wherein the audio classification includes both acoustic environment classification and audio event detection.

By one or more third implementations, and further to the first or second implementation, wherein the audio classification includes instant speech detection (ISD).

By one or more fourth implementations, and further to any of the first to third implementation, wherein the automatic speech recognition comprises always-on keyword spotting.

By one or more fifth implementations, and further to any of the first to fourth implementation, wherein the extracting comprises extracting low-level features that are frequency levels.

By one or more sixth implementations, and further to any of the first to fifth implementation, wherein the extracting comprises extracting high-level features using convolutional layers that provide output used by both (1) and (2).

By one or more seventh implementations, and further to any of the first to sixth implementation, wherein the method comprises extracting high-level features comprising using convolutional layers that provide output used for both acoustic environment classification and audio event detection but not keyword spotting.

By one or more eighth implementations, and further to any of the first to sixth implementation, wherein the method comprises extracting high-level features comprising using convolutional layers that provide output used for both acoustic environment classification and audio event detection but not keyword spotting, and wherein the convolutional layers also are shared by instant speech detection (ISD) operations.

By one or more ninth implementations, and further to any of the first to eighth implementation, wherein (1) and (2) share the same sound energy detector (SED) to detect sounds in the audio signal to activate the extracting, and based on a scale that targets non-speech sounds.

By an example one or more tenth implementation, A system for performing audio processing comprises memory to store audio signal data; and processor circuitry forming at least one processor coupled to the memory, and the at least one processor to operate by: extracting features from an audio signal; and using the same extracted features to perform both: (1) automatic speech recognition that recognizes human speech in the audio signal, and (2) audio classification that recognizes audio patterns in the audio signal not limited to human speech.

By one or more eleventh implementations, and further to the tenth implementation, wherein the extracting comprises extracting low-level features using a human perception-based filterbank to perform both the automatic speech recognition and audio classification.

By one or more twelfth implementations, and further to the tenth implementation, wherein the extracting comprises inputting audio signal values of the audio signal into one or more low-level convolutional layers to output low-level features rather than computing Mel-frequency-related features as low-level features, and to perform both the automatic speech recognition and audio classification.

By one or more thirteenth implementations, and further to any of the tenth to twelfth implementations, wherein the extracting comprises generating output of high-level convolution layers, wherein the output is used by both acoustic environment classification and audio event detection operations.

By one or more fourteenth implementations, and further to any of the tenth to twelfth implementation, wherein the extracting comprises generating output of high-level convolution layers, wherein the output is used by both acoustic environment classification and audio event detection operations, and wherein the output is used to perform instant speech detection.

By one or more fifteenth implementations, and further to any of the tenth to twelfth implementation, wherein the extracting comprises generating output of high-level convolution layers, wherein the output is used by both acoustic environment classification and audio event detection operations, and wherein the output is used to perform automatic speech recognition.

By one or more sixteenth implementations, and further to any of the tenth to fifteenth implementation, wherein the automatic speech recognition comprises keyword spotting used to awaken a computing device.

By one or more seventeenth implementation, and further to any of the tenth to sixteenth implementation, wherein (1) and (2) share the same sound energy detector (SED) to detect sounds in the audio signal to activate the extracting.

By an example one or more eighteenth implementations, at least one non-transitory article having at least one machine readable medium comprising a plurality of instructions that, in response to being executed on a computing device, cause the computing device to operate by: extracting features from an audio signal; and using the same extracted features to perform both: (1) automatic speech recognition that recognizes human speech in the audio signal, and (2) audio classification that recognizes audio patterns in the audio signal not limited to human speech.

By one or more nineteenth implementations, and further to the eighteenth implementation, wherein the same extracted features are used to perform both acoustic environment classification and audio event detection.

By one or more twentieth implementations, and further to the eighteenth implementation or nineteenth implementation, wherein the extracting comprises extracting low-level features shared by (1) and (2), and extracting high level features shared by a plurality of audio classification tasks included in (2).

By one or more twenty-first implementations, and further to the eighteenth implementation or nineteenth implementation, wherein the extracting comprises extracting low-level features and high-level features formed by using the low-level features and that are shared by (1) and (2).

By one or more twenty-second implementations, and further to the eighteenth implementation, wherein the extracting comprises extracting high-level features used to form audio samples having a first duration and used to perform (1) and separately extracting high-level features to form audio samples of a different duration than the first duration to perform (2).

By one or more twenty-third implementations, and further to the eighteenth implementation, wherein the extracting comprises extracting high-level features used to form audio samples having a first duration and used to perform (1) and separately extracting high-level features to form audio samples of a different duration than the first duration to perform (2), and wherein the automatic speech recognition uses about 50 to 200 ms audio samples while the audio classification uses samples of about 0.5 to 2.0 seconds.

By one or more twenty-fourth implementations, and further to any of the eighteenth to twenty-second implementation, wherein the instructions cause the computing device to operate by detecting sound energy to activate feature extraction and set to detect both human voice and non-human voice sounds, and wherein the extracting comprises extracting low-level features based on a human-perception-based frequency level scale used for speech recognition without specifically providing levels for non-speech.

By one or more twenty-fifth implementations, and further to the eighteenth implementation, wherein the extracting comprises outputting high-level features in the form of samples of multiple different sample durations depending on an audio task to be performed with the samples.

In one or more twenty-sixth implementations, at least one machine readable medium includes a plurality of instructions that in response to being executed on a computing device, cause the computing device to perform a method according to any one of the above implementations.

In one or more twenty-seventh implementations, an apparatus may include means for performing a method according to any one of the above implementations.

It will be recognized that the implementations are not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the implementations should, therefore, be determined with reference to the appended claims, along with the full scope of equivalents to which such claims are entitled.

What is claimed is:

1. A computer-implemented method of audio processing comprising:
    extracting features from an audio signal; and
    using the extracted features to perform:
        (1) automatic speech recognition that recognizes human speech in the audio signal, and
        (2) audio classification that recognizes audio patterns in the audio signal;
    wherein extracting comprises inputting audio signal values of the audio signal into one or more low-level convolutional layers to output low-level features, wherein the low-level convolutional layers parameterize the audio signal frequency levels, and wherein the extracted features include the low-level features.

2. The method of claim 1, wherein extracting comprises extracting high-level features using second convolutional layers, the high-level features representing frequency-domain patterns, and wherein the audio classification includes acoustic environment classification and audio event detection.

3. The method of claim 1, wherein extracting excludes computing Mel-frequency-related features as low level features, and wherein the audio classification includes instant speech detection (ISD).

4. The method of claim 1, wherein extracting comprises extracting high-level features arranged to provide a time series of feature vectors, and wherein the automatic speech recognition comprises always-on keyword spotting.

5. The method of claim 1, wherein the low-level features are frequency levels excluding Mel-frequency features.

6. The method of claim 1, wherein the one or more low-level convolutional layers are first convolutional layers, and wherein extracting comprises extracting high-level features using second convolutional layers, max pooling layers, and rectified linear unit activation, that provide output used by (1) and (2).

7. The method of claim 1, wherein the one or more low-level convolutional layers are first convolutional layers, and wherein extracting features from the audio signal includes extracting high-level features comprising using second convolutional layers that provide output used for acoustic environment classification and audio event detection, wherein the output includes feature vectors.

8. The method of claim 7 wherein the second convolutional layers also are shared by instant speech detection (ISD) operations, and wherein the output represents long duration spectral pattern characteristics.

9. The method of claim 1, wherein (1) and (2) share a sound energy detector (SED), the SED to detect sounds in the audio signal to activate the extracting, based on a scale that targets non-speech sounds.

10. A system for performing audio processing comprising:
memory to store audio signal data; and
processor circuitry forming at least one processor coupled to the memory, the at least one processor to operate by:
extracting features from an audio signal; and
using the extracted features to perform:
(1) automatic speech recognition that recognizes human speech in the audio signal, and
(2) audio classification that recognizes audio patterns in the audio signal;
wherein extracting comprises inputting audio signal values of the audio signal into one or more low-level convolutional layers to output low-level features, wherein the low-level convolutional layers parameterize the audio signal frequency levels, and wherein the extracted features include the low-level features.

11. The system of claim 10 wherein extracting comprises extracting low-level features using a human perception-based filterbank to perform the automatic speech recognition and audio classification.

12. The system of claim 10 wherein extracting excludes computing Mel-frequency-related features as low level features, and wherein performing the automatic speech recognition and the audio classification includes performing the automatic speech recognition and the audio classification based on the low-level features.

13. The system of claim 10, wherein extracting features from the audio signal comprises generating output of high-level convolution layers, the output including feature vectors, wherein the output is used by the acoustic environment classification and the audio event detection operations.

14. The system of claim 13, wherein the output is used to perform instant speech detection.

15. The system of claim 13, wherein extracting comprises extracting high-level features at the high-level convolutional layers, the high-level features arranged to provide a time series of the feature vectors, and wherein the output is used to perform automatic speech recognition.

16. The system of claim 10, wherein the automatic speech recognition comprises keyword spotting used to awaken a computing device.

17. The system of claim 10, wherein (1) and (2) share a sound energy detector (SED), the SED to detect sounds in the audio signal to activate the extracting.

18. At least one non-transitory article having at least one machine readable medium comprising a plurality of instructions that, in response to being executed on a computing device, cause the computing device to operate by:
extracting features from an audio signal; and
using the extracted features to perform:
(1) automatic speech recognition that recognizes human speech in the audio signal, and
(2) audio classification that recognizes audio patterns in the audio signal;
wherein extracting comprises inputting audio signal values of the audio signal into one or more low-level convolutional layers to output low-level features, wherein the low-level convolutional layers parameterize the audio signal frequency levels, and wherein the extracted features include the low-level features.

19. The article of claim 18, wherein extracting further comprises extracting high-level features using second convolutional layers, the high-level features representing frequency-domain patterns, and wherein the extracted features are used to perform acoustic environment classification and audio event detection.

20. The article of claim 18, wherein extracting excludes computing Mel-frequency-related features as low level features, and wherein extracting further comprises:
extracting low-level features shared by (1) and (2), and
extracting high level features shared by a plurality of audio classification tasks included in (2).

21. The article of claim 20, wherein extracting further comprises extracting low-level features and high-level features formed by using the low-level features that are shared by (1) and (2).

22. The article of claim 18, wherein extracting comprises extracting high-level features used to form audio samples having a first duration and used to perform (1) and separately extracting high-level features to form audio samples of a different duration than the first duration to perform (2).

23. The article of claim 22, wherein the automatic speech recognition uses 50 to 200 ms audio samples while the audio classification uses samples of 0.5 to 2.0 seconds.

24. The article of claim 18, wherein the instructions cause the computing device to operate by detecting sound energy to activate feature extraction and set to detect human voice and non-human voice sounds, and wherein extracting comprises extracting the low-level features based on a human-perception-based frequency level scale used for speech recognition without specifically providing levels for non-speech.

25. The article of claim 18, wherein extracting comprises outputting high-level features in the form of samples of multiple different sample durations depending on an audio task to be performed with the samples.

* * * * *